(12) United States Patent
Dageville et al.

(10) Patent No.: US 6,826,753 B1
(45) Date of Patent: Nov. 30, 2004

(54) MANAGING PARALLEL EXECUTION OF WORK GRANULES ACCORDING TO THEIR AFFINITY

(75) Inventors: Benoit Dageville, Redwood Shores, CA (US); Patrick A. Amor, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/415,031

(22) Filed: Oct. 7, 1999

Related U.S. Application Data

(63) Continuation-in-part of application No. 09/406,482, filed on Sep. 27, 1999, now Pat. No. 6,609,131.

(51) Int. Cl.$^7$ .............................................. G06F 9/00
(52) U.S. Cl. ......................... 718/102; 718/100; 707/1; 707/3
(58) Field of Search ............................... 709/100, 102; 707/8, 3, 201, 202, 206, 100, 2

(56) References Cited

U.S. PATENT DOCUMENTS

| | | | |
|---|---|---|---|
| 4,633,387 A | 12/1986 | Hartung et al. | 364/200 |
| 4,980,822 A | 12/1990 | Brantley et al. | 364/200 |
| 5,307,485 A | 4/1994 | Bordonaro | 395/600 |
| 5,325,525 A | 6/1994 | Shan et al. | 395/650 |
| 5,592,671 A | 1/1997 | Hirayama et al. | 395/674 |
| 5,675,791 A | 10/1997 | Bhide et al. | |
| 5,692,182 A | 11/1997 | Desai et al. | 707/2 |
| 5,848,408 A * | 12/1998 | Jakobsson et al. | 707/3 |
| 5,870,743 A | 2/1999 | Cohen et al. | 707/8 |
| 5,892,945 A | 4/1999 | Mirchandaney et al. | 395/674 |
| 5,956,704 A | 9/1999 | Gautam et al. | 707/1 |
| 5,970,495 A | 10/1999 | Baru et al. | |
| 6,003,036 A | 12/1999 | Martin | |
| 6,023,702 A * | 2/2000 | Leisten et al. | 707/100 |
| 6,069,705 A * | 5/2000 | Suvarna | 358/1.13 |
| 6,092,062 A | 7/2000 | Lohman et al. | |
| 6,112,198 A | 8/2000 | Lohman et al. | 707/3 |
| 6,112,225 A | 8/2000 | Kraft et al. | 709/202 |
| 6,223,182 B1 | 4/2001 | Agarwal et al. | 707/102 |
| 6,240,428 B1 | 5/2001 | Yeung et al. | 707/206 |
| 6,263,331 B1 | 7/2001 | Liu et al. | 707/4 |
| 6,345,267 B1 * | 2/2002 | Lohman et al. | 707/2 |
| 6,438,562 B1 * | 8/2002 | Gupta et al. | 707/201 |
| 6,505,227 B1 * | 1/2003 | Mirchandaney et al. | 709/102 |

\* cited by examiner

*Primary Examiner*—Meng-Al T. An
*Assistant Examiner*—Lilian Vo
(74) *Attorney, Agent, or Firm*—Marcel K. Bingham; Hickman Palermo Truong & Becker LLP

(57) ABSTRACT

A method and apparatus are provided for managing work granules being executed in parallel. A task is evenly divided between a number of work granules. The number of work granules falls between a threshold minimum and a threshold maximum. The threshold minimum and maximum may be configured to balance a variety of efficiency factors affected by the number of work granules, including workload skew and overhead incurred in managing larger number of work granules. Work granules are distributed to processes on nodes according to which of the nodes, if any, may execute the work granule efficiently. A variety of factors may used to determine where a work granule may be performed efficiently, including whether data accessed during the execution of a work granule may be locally accessed by a node.

10 Claims, 9 Drawing Sheets

MANAGING PARALLEL EXECUTION OF WORK GRANULES ACCORDING TO THEIR AFFINITY

This application is a continuation-in-part of application Ser. No. 09/406,482, filed on Sep. 27, 1999, now U.S. Pat. No. 6,609,131, "entitled PARALLEL PARTITION-WISE JOINS", by the following named inventor(s): MOHAMED ZAIT, BENOIT DAGEVILLE.

FIELD OF THE INVENTION

The present invention relates to parallel execution of task by a set of processes, and in particular, dividing a task into subtasks and assigning the subtasks to processes.

BACKGROUND OF THE INVENTION

To fully utilize the computing power of a multi-processing system, a larger task (a "parent task") may be divided into smaller tasks ("work granules") which are then distributed to processes ("slave processes") running on one or more processing nodes. Each node in a multi-processing system may contain multiple processors and multiple concurrent processes. The process that divides parent tasks into work granules and distributes the work granules to slave processes on the various processing nodes is referred to herein as the coordinator process.

Databases that run on multi-processing systems typically fall into two categories: shared disk databases and shared nothing databases. A shared disk database expects all disks to be visible to all processing nodes on the computer system on which the database runs. Consequently, a coordinator process in a shared disk database may assign any work granule to a slave process on any node, regardless of the location of the disk that contains the data that will be accessed during the work granule. Shared disk databases may be run on both shared nothing and shared disk computer systems. To run a shared disk database on a shared nothing computer system, software support may be added to the operating system or additional hardware may be provided to allow processes to have direct access to remote disks.

A shared nothing database assumes that a process can only access data if the data is contained on a disk that belongs to the same node as the process. Consequently, a coordinator process in a shared nothing database can only assign a work granule to a slave process if the data to be processed in the work granule resides on a disk in the same node as the process. Shared nothing databases may be run on both shared disk and shared nothing multi-processing systems. To run a shared nothing database on a shared disk machine, a mechanism may be provided for logically dividing the disks so that each of the disks is assigned to a particular node.

The power of database systems that run on multi-processing systems stems from the fact that many processors can be working in parallel on the same task. This power would be wasted if all work is assigned to a process running on a single node within the system, while processes on the other nodes remained idle. In general, the more evenly work is distributed, the greater the benefit derived from the parallelism provided by the system architecture. The more skewed the workload distribution, the less efficient the use of the multi-processing system. Ideally, work granules are distributed so all slave processes working on the work granules of the same parent task will complete their work granules at the same time.

There are numerous causes for skewed workload distributions. For example, in a shared disk database, a coordinator process may assign a work granule that may be performed more efficiently by a slave process on one node to a slave process on another node due to the location of data accessed by the work granule. Specifically, in a shared nothing computer system, the amount of time required for a process within a node to access data on a disk within the same node (a "local access") is significantly less than the amount of time required for the same process to access data on a disk within another node (a "remote access"). However, under the assumption that processes on all nodes have equal access to all disks, the coordinator process in some shared databases may assign a work granule that accesses data in a first node to a slave process running on a second node even if a slave process on the first node is available to perform the work granule. Because a slave process that is executing an assigned work granule may have to remotely access data, the slave process may be executing the granule after other slave processes have completed execution of work granules assigned to the slave processes.

The process of managing work granules to reduce skewed work load distributions is referred to herein as work load skew management. One approach to work load skew management is referred to as the 9-3-1 technique. Under the 9-3-1 technique, work is divided among a set of slave processes into equal parts, one part for each slave process. Each part is then subdivided into work granules according to the ratio 9-3-1. For example, assume that an amount of work W is to be shared between three slave processes. The work is divided into three parts, one for each of the slave processes. Each part is further subdivided according to the ratio 9-3-1. Thus, work W is ultimately apportioned to a slave process as follows: $9/13*1/3$ W, $3/13*1/3$ W, and $1/13*1/3$ W.

When the coordinator process assigns a work granule to a slave process, it first assigns the largest of the work granules for the slave process, i.e. the 9/13 portion. When a slave process completes a work granule, the coordinator process assigns to the slave process one of the remaining smaller work granules for the slave process. If a slave process completes all of its work granules, and another slave process has not completed its work granules, the coordinator "steals" the work granule from the busy slave process and assigns it to the slave process that has completed its own work granules. Consequently, both slave processes continue to perform work, and the work load distribution skew is reduced, if not avoided.

A disadvantage of the 9-3-1 technique is that it is usually difficult to both split a task into the dictated portions and split the task in a manner that accounts for other efficiency considerations. For example, a task AB entails access to data that is equally distributed at a location A and location B. Data at location A is locally accessible from a node A, data at location B is locally accessible from a node B. Three slave processes are available to execute the task. A process A1 and A2 executes on node A, a process B1 executes on node B. To distribute the task according to the 9-3-1 technique, the largest of the work granules designated for process A2 is assigned a portion of the task that entails access to data at location A and location B. Data at location B is remotely accessed by process A2, causing A2 to execute its largest work granule much more slowly. The smaller work granules for process A2 are redistributed to process A1 and B1. However, due to slowness of the execution of process A2, the redistribution of work load does not significantly offset the disparity in execution times between process A1 and B1, and process B2. Thus, in applying the 9-3-1 technique, not only were other efficiency considerations ignored, but as a result of ignoring them, the work distribution skew may have been actually worsened.

Another disadvantage of the 9-3-1 technique is in allocating work to a work granule that is substantially larger than other work granules, the technique puts "too many eggs in one basket". If the largest work granule is executed slowly, the work load skew is not only created, but may be substantially worsened. This may occur even when work is divided in a manner that accounts for efficiency considerations, such as locality of data.

For example, a task C entails access to data, in the form of rows in a table that reside at a location A. Data at location A is locally accessible from a node A. Three slave processes on node A are available to execute task A, and are assigned work according to the 9-3-1 technique. The largest work granules are assigned to each of the three slave processes. The slave processes apply a filter to the rows they read. The rows that pass the filter are stored by the slave processes. For two of the slave processes, relatively few of the rows read by them pass the filter, and relatively few of the read rows are stored. However, for a third slave process, most rows read pass the filter. The third slave process thus expends a relatively large amount of work storing the rows, writing them to a buffer on disk, and, as a consequence, executes its larger work granule very slowly, causing significant disparity in execution times. The disparity is further aggravated by a relatively large portion of work originally designated for the third slave process being assigned to its largest work granule.

Based on the foregoing, it desirable to provide a work load skew management mechanism that dynamically transfers work designated for a process to another process and that allows work to be divided and assigned to processes in a manner that accounts for multiple efficiency considerations.

SUMMARY OF THE INVENTION

The foregoing needs and objects, and other needs and objects that will become apparent from the following description, are achieved by the present invention, which comprises, in one aspect, a mechanism for managing work granules executed in parallel.

According to an aspect of the present invention, a task is evenly divided between a number of work granules. The number of work granules falls between a threshold minimum and a threshold maximum. The threshold minimum and maximum may be configured to balance a variety of efficiency factors affected by the number of work granules, including workload skew and overhead incurred in managing a larger number of work granules.

According to another aspect of the present invention, work granules are distributed to processes on nodes according to which of the nodes, if any, may execute the work granule more efficiently than other nodes. A variety of factors may be used to determine where a work granule may be performed most efficiently, including which nodes have local access to the data accessed during the execution of a work granule. Finally, work granules are classified according to whether they access sections of tables referred to as partitions.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing the parallel execution of work granules is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Overview

A task is evenly distributed between a quantity of work granules. Distributing work evenly between work granules tends to reduce work load skew. The quantity of work granules to which work is distributed is adjusted, as needed, to fall between a threshold minimum and a threshold maximum. The threshold minimum and maximum may be configured to balance a variety of efficiency factors, including workload skew and overhead in managing work granules. A distribution with a greater number of work granules tends to reduce work load skew but increase overhead to manage a larger set of granules, while a distribution with a lesser number of work granules tends to increase work load skew but decrease overhead to manage a smaller set of work granules.

In addition, work load is distributed to work granules according their affinity. Affinity is the tendency of a unit of work, such as a work granule, to be more efficiently executed by a particular entity, such as a process or a node. A variety of factors ("affinity factors") may be used to determine the affinity of a work granule, including whether data accessed during the execution of the work granule may be locally accessed by a node. Generally, work granules have an affinity for a node that may locally access data processed during the execution of the work granules. Other affinity factors include computational capacity of a node. Work granules that are computationally intensive may run more efficiently on nodes with greater available computational capacity. Another affinity factor may be network access. Work granules requiring network access may be executed more efficiently by nodes with access to more powerful networks, or faster connections to a particular network.

Exemplary Coordinating System

Figure 1:
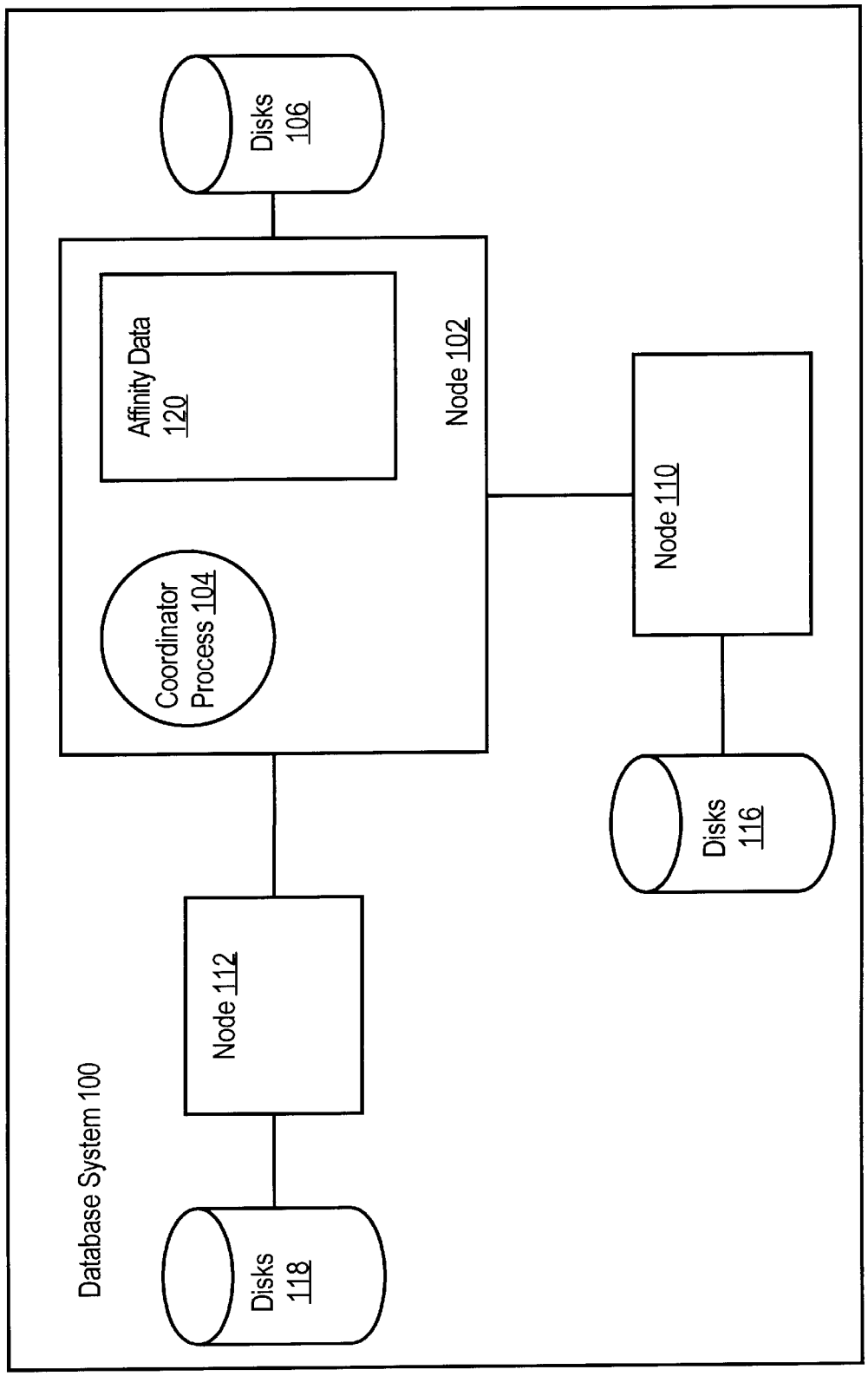
FIG. 1 is a block diagram depicting an exemplary database system upon which an embodiment of the present invention may implemented.

FIG. 1 is a block diagram of a database system 100 configured according to an embodiment of the present invention. Database system 100 includes three interconnected nodes 102, 110 and 112, node 102 is connected to disks 106 and is executing a coordinator process 104. Node 110 is connected to disks 116, and node 112 is connected to disks 118. A shared disk mechanism (not shown) allows nodes 102, 110 and 112 to access data on disks that belong to remote nodes.

Coordinator process 104 participates in the management of tasks executed in parallel for database system 100. In particular, coordinator process 104 divides each task into work granules, and distributes the work granules to slave processes that may be executing on either of nodes 102, 110, and 112. The techniques for dividing a task into work granules and distributing them to slave processes for execution shall be later described.

To generate and distribute the work granules so that they may be efficiently executed, coordinator process 104 needs information that may be used to determine how efficiently a work granule may execute on a node. Such information is stored in affinity data 120. Affinity data 120 includes information such as the number of slave processes running on each of nodes 102, 110, and 112, what disks store particular data files, which data files are used to store particular database tables or other database objects, and the organization of tables and other database objects.

The information contained in affinity data 120 depends on what affinity factors are being used to determine affinity. For example, if the computational power of nodes is an affinity factor, then affinity data 120 may contain data that specifies the computational power of nodes 112, 102 and 110.

Organization of Data to be Accessed

As mentioned previously, work granules are assigned work in a manner that accounts for how data is organized. How data is organized or stored affects how efficiently slave processes execute work granules.

Figure 2:
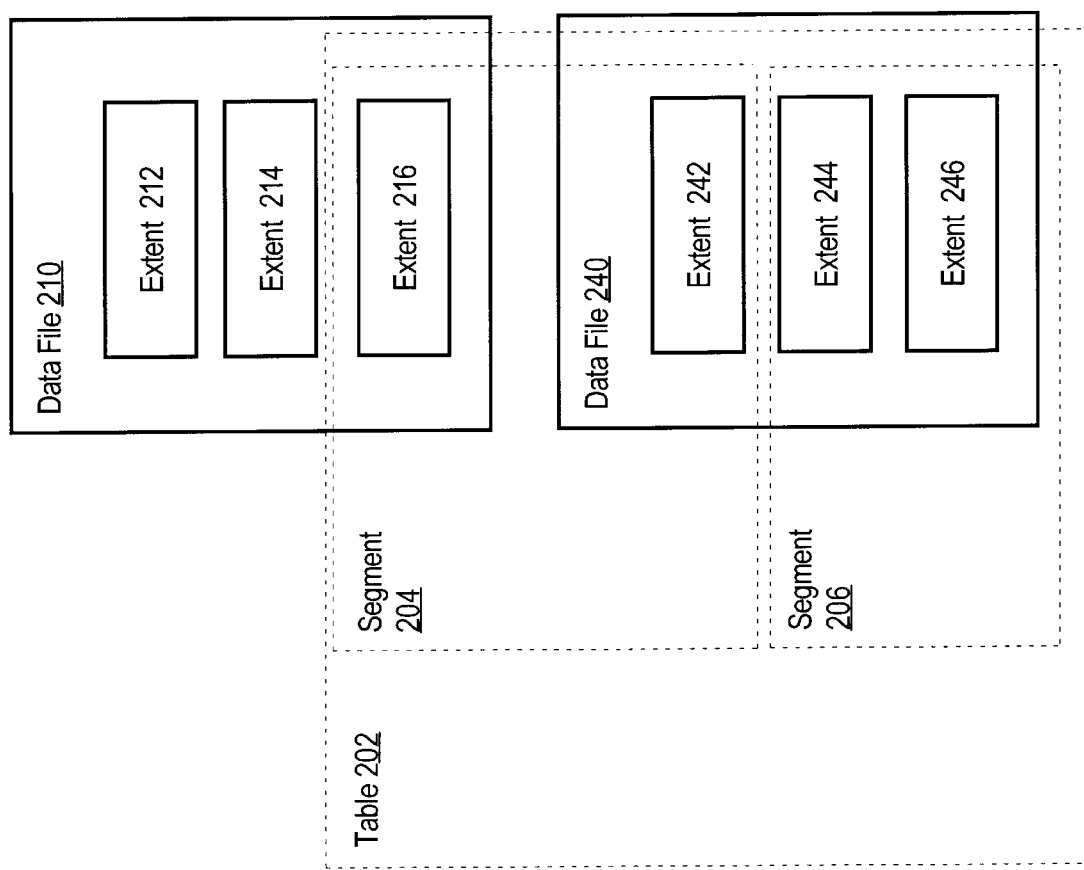
FIG. 2 is a block diagram depicting an organization of data structures used to store data, including a data file, a table, extents, and segments.

FIG. 2 is a diagram depicting how various tables and database objects are organized and stored on disks 106, 118, and 116. Data files 210 and 240 may reside on separate disks or the same disk. Data files 210 and 240 include multiple sets of contiguous data blocks referred to as extents. In particular, data File 210 includes extents 212, 214, and 216, and data file 240 includes extents 242, 244 and 246.

A segment is composed of one or more extents. Segment 204 includes extent 216 and 242, and segment 206 includes extents 244 and 246. A table is composed of one or more segments. Table 202 includes Segments 204 and 206.

Partitions

Tables managed by a database system may be partitioned. With partitioning, an object, such as a database table, is divided up into sub-tables, referred to as "partitions". A common form of partitioning is referred to as range partitioning. With range partitioning, each individual partition corresponds to a particular range of values for one or more "partition key columns" of the table.

Figure 3:
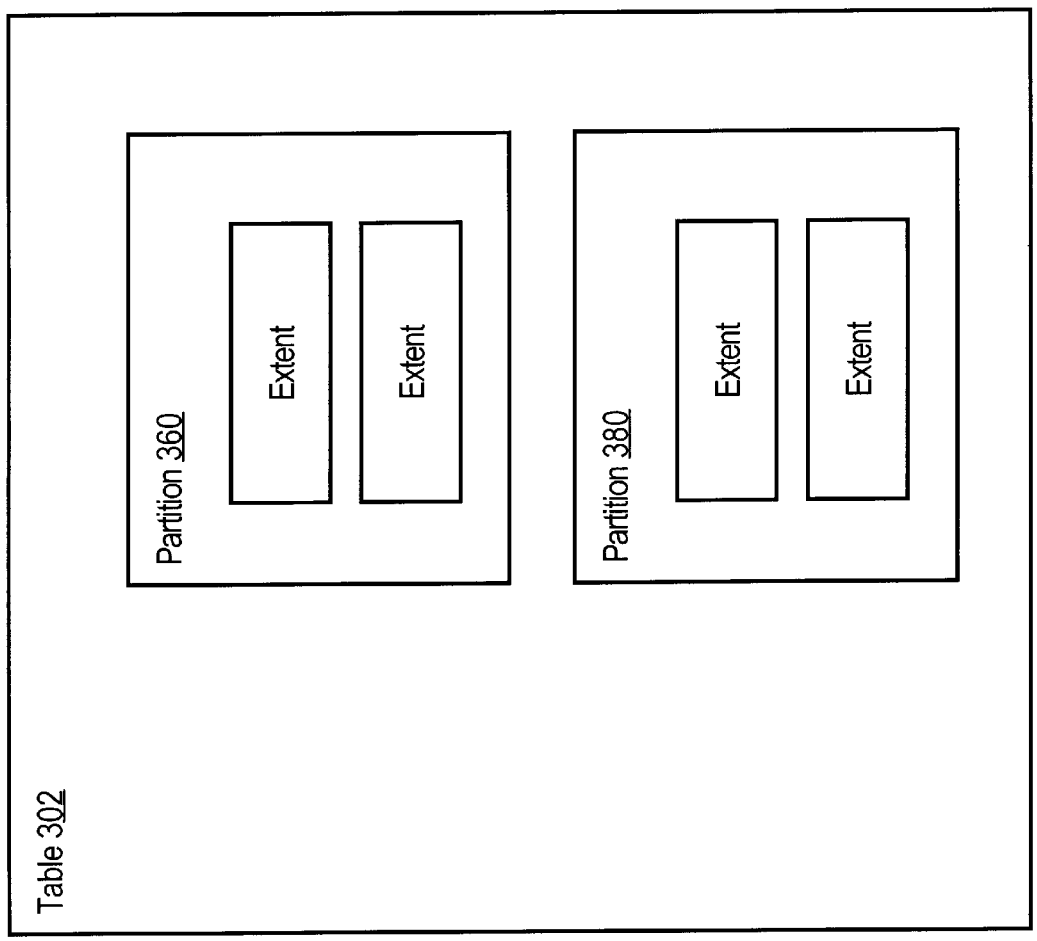
FIG. 3 is a block diagram depicting table partitions.

FIG. 3 shows a partitioned table 302. Table 302 is divided into partitions that include Partition 360 and 380. A column of table 302 stores date values that fall within a particular year, and the table may be divided into twelve partitions (not all of them shown), each of which corresponds to a month of that year. All rows that have a particular month in the date column would then be inserted into the partition that corresponds to that month. Partition 360 corresponds to January, hence all rows with a January date value in the date column are inserted into the Partition 360.

Partitions 360 and 380 each include one segment (not shown), and consequently, include the one or more extents that belong to the segments. Partitioning Table 302 in this manner increases the efficiency of processing queries that select rows based on the month contained in the date column. For example, if a particular query selected all rows where month equals January, then only Partition 360 would have to be scanned.

Work Granule Types

A task may involve one or more operations that are divided into work granules. Types of operations include scanning rows from tables or inserting or updating rows in a partition. For example, a table may be partitioned according to the date value in a column. A query requests data grouped by the partition key column. Because executing the query involves the operation of scanning from partitions, and each of the partitions can be processed individually, the operation of scanning the partitions is divided into work granules according to partition. The operation being divided into work granules may be used to classify work granules.

Figure 4:
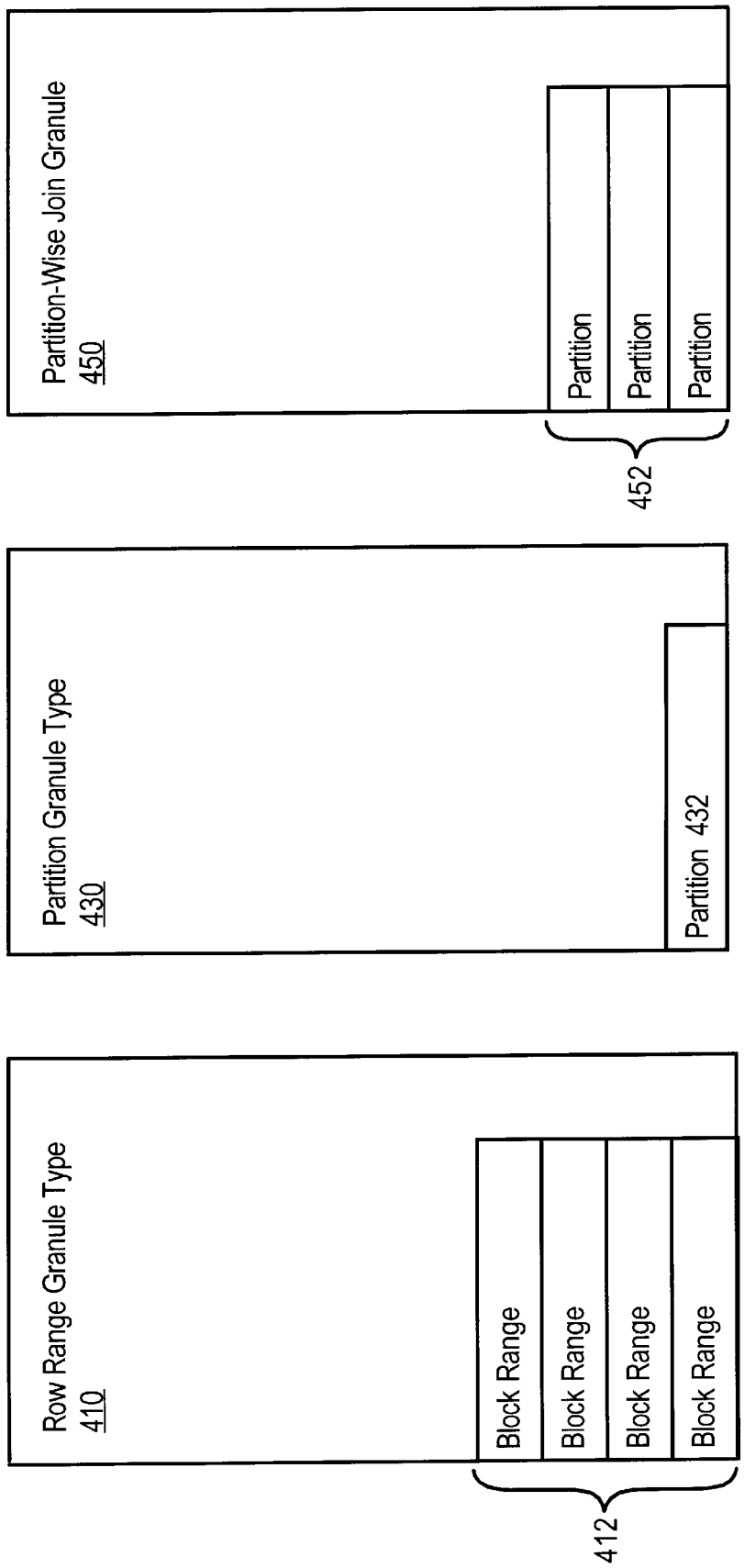
FIG. 4 is a block diagram depicting Work Granule Types.

FIG. 4 is a block diagram depicting of Work Granule Types according to an embodiment of the present invention. FIG. 4 depicts Block Range Granule Type 410, Partition Granule Type 430, and Partition-Wise Join Type 450.

Block Range Work Granules: A Block Range Granule Type 410 is used for operations that are divided into work granules according to one or more contiguous ranges of blocks 412 from a table. During execution of a work granule belonging to the Block Range Granule Type 410, a slave process scans the one or more ranges of blocks. In addition to scanning, the slave process may perform other operations, such as applying a filter to the scanned in rows, and storing rows that satisfy the filter for later use in subsequent operations. Subsequent operations include operations performed by the slave process or other slave processes, such as ordering the rows according to values contained in a particular column. A Range Granule Type may be assigned a set of block ranges that overlap one or more extents, or may be restricted to a set of block ranges that span no more than one data file.

Partition Work Granules: A Partition Granule Type 430 is used for operations that are divided into work granules according to partitions, one partition per work granule. During execution of a work granule belonging to the Partition Granule Type 430, a slave process scans rows from the partition assigned to the work granule. In addition to scanning the rows, the slave process may perform other operations, such as applying a filter to the scanned in rows, and storing rows that satisfy the filter for later use in subsequent operations. Subsequent operations include operations performed by the slave process or other slave processes, such as ordering the rows according to values contained in a particular column.

Partition-Wise Join Granule: Some operations involve the join of tables based on a join key between tables that are partitioned by the join key. Such operations may utilize Partition-Wise Work Granules that define "minijoins" between respective partitions of each table. A technique for dividing a task into minijoins is described in U.S. Patent Application No. 09/406,482, "Parallel Partition-Wise Joins", assigned to the assignee of the present application, filed by Mohamed Zait and Benoit Dageville, the contents of which are herein incorporated by reference.

A Partition-Wise Granule Type corresponds to a unit of work based on partitions, and in particular, multiple partitions 452 (one or more partitions from each of the joined objects). During execution of a work granule belonging to the Partition-Wise Join Granule Type 450, a slave process scans rows from the partitions that correspond to the work granule. In addition to scanning rows, the slave process may perform other operations, such as subsequent join operations between scanned rows.

Factors for Determining the Number and Relative Size of Work Granules

In dividing a task into work granules, a variety of factors may be accounted for. These factors include granularity (i.e. the number of work granules a task is divided into), and the relative size of each of the work granules. Finer granularity entails a greater number of work granules. A greater number of work granules requires more overhead to manage the work granules. For example, a greater number of work granules requires that the task of assigning a work granule to a slave process be performed a greater number of times.

On the other hand, coarser granularity increases the quantity of work assigned to individual work granules. Increased quantity of work increases the risk of work load skew. Work load skew is caused by a disparity in execution times of work granules. Assigning the larger work quantities tends to increase the execution time of all work granules, including inefficiently executed work granules. Increasing the execution time of inefficiently executed work granules may increase disparity in execution times.

Uniform size decreases disparity of execution times. A uniform size tends to ensure that there are no relatively large work granules.

Division of Tasks into Work Granules

Figure 5:
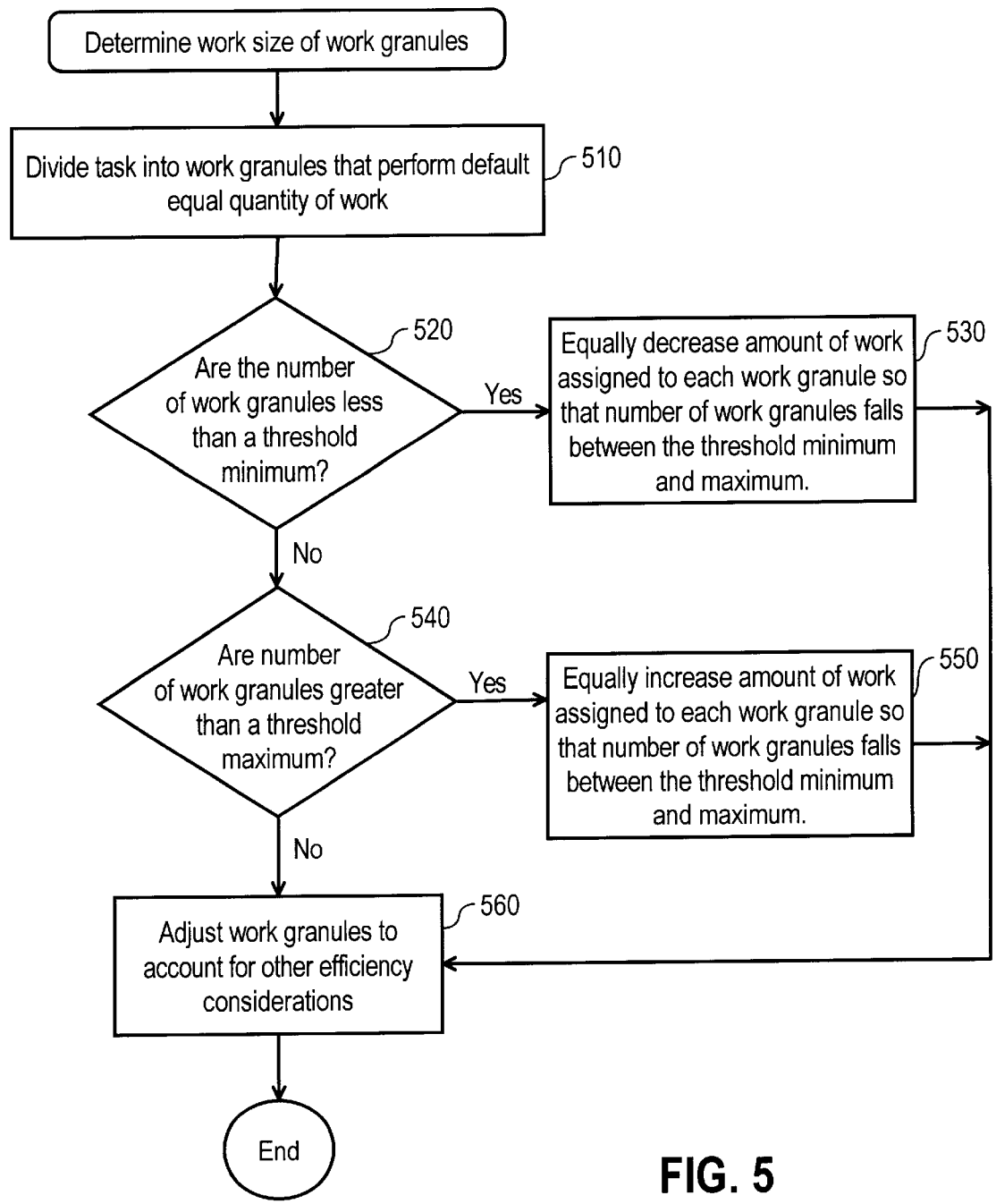
FIG. 5 is a flow chart depicting a process for dividing a task into equal amounts of work that are assigned to work granules.

FIG. 5 is a flow chart depicting a process for determining the "work size" of work granules into which a operation should be divided. According to an embodiment of the present invention, the process is performed for work granules belonging to the Block Range Granule Type. The process involves selecting a number of work granules that fall between a minimum threshold number and a maximum threshold number per slave process that participate in executing the task. The minimum and maximum threshold are selected to achieve a desired balance between management overhead and finer granularity. For purposes of illustration, the selected minimum and maximum threshold are 13 and 100, respectively.

Referring to FIG. 5, at step 510, the task is divided into work granules that perform a default quantity of work. A default quantity of work, may be, for example, a block range to scan that is the equivalent of scanning 100 megabytes ("Mb") of data. The quantity of work may not be an even multiple of 100 Mb. In this case, one or a few work granules may be assigned lower amounts of work.

For example, assume that a task requires scanning 3050 Mb. Dividing this task into work granules that scan 100 Mb creates thirty 100 Mb work granules, leaving 50 Mb to be assigned to another work granule.

At step 520, it is determined whether the number of work granules falls below a threshold minimum per slave process. If the number of work granules falls below the threshold minimum, then control flows to step 530. Otherwise, control flows to step 540. For the purpose of illustration, assume that three slave processes are available, thus, in the current example, the number of work granules per slave process is 10 1/3, a number below the minimum threshold of 13. Therefore, control flows to step 530.

At step 530, the number of work granules is adjusted upward by equally decreasing the quantity of work to be assigned to each work granule. In this example, the quantity of work assigned to each work granule is reduced to the equivalent of 50 Mb, resulting in the number of work granules per slave process of 20 and 1/3. This number falls between the threshold. Control then flows to step 560.

If on the other hand, at step 520, it is determined that the number of work granules does not fall below a threshold minimum per slave process, then control flows to step 540. At step 540, it is determined whether the number of work granules is greater than a threshold maximum per slave process. If the number of work granules is greater than a threshold maximum, then control flows to step 550. At step 550, the number of work granules is adjusted downward by equally increasing the quantity of work to be assigned to each granule. Control flows to step 560.

At step 560, the quantity of work assigned to each granule may be further adjusted to account for other efficiency factors. For example, the range of blocks assigned to a particular granule may partially overlap the range of blocks associated with an extent. The range of blocks assigned to each may be further adjusted so that the boundaries of ranges coincide with the boundaries of the extent. When the boundaries coincide, disk accesses that occur during execution of a work granule are further concentrated to the same area of a disk. Movement of disk heads is thereby reduced during execution of the work granule, and system performance is improved.

Establishing the Affinity of Work Granules

Figure 6:
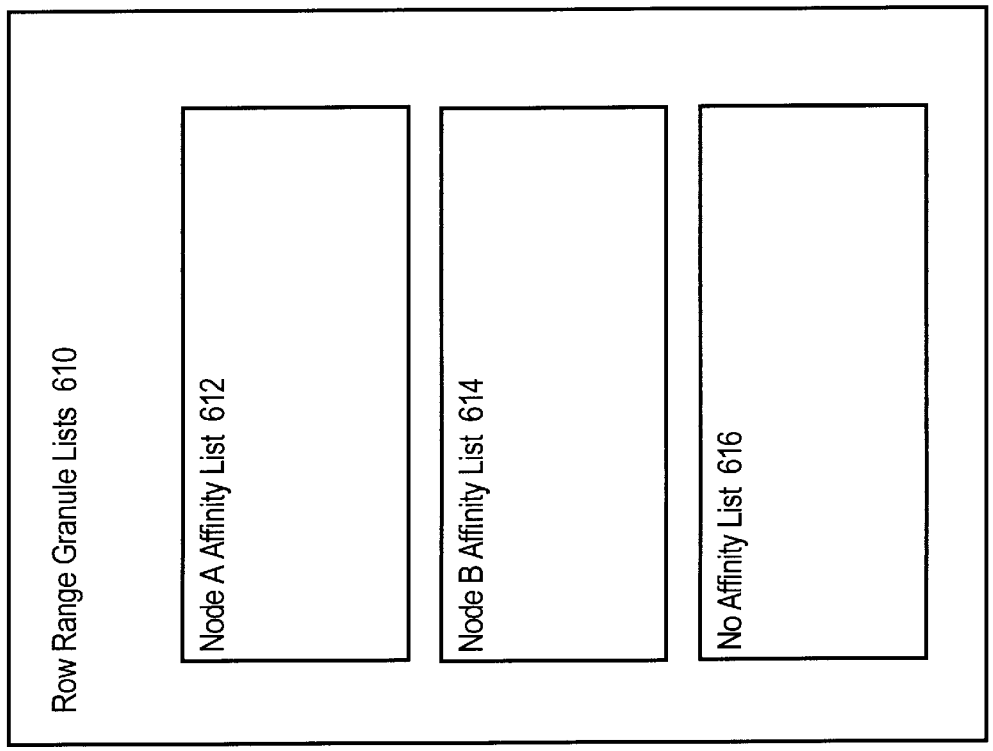
FIG. 6 is a flow chart depicting lists organized by Work Granule Type and affinity.
Figure 7:
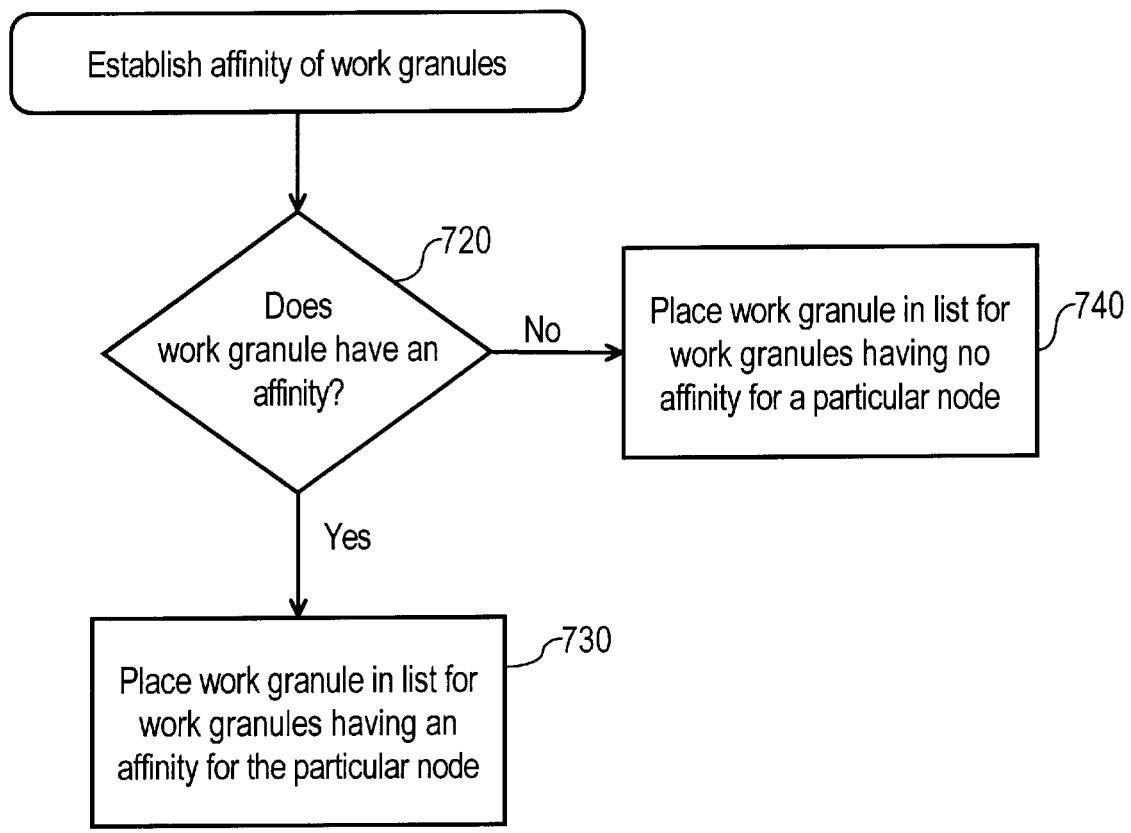
FIG. 7 is a flow chart depicting a process for establishing the affinity of work granules.

Before work may be assigned to slave processes based on the affinity of work granules, the coordinator process 104 establishes the affinity of each of the work granules for an operation. Establishing the affinity of the work granules entails determining the affinity of each of the work granules, if any, and generating data that specifies the affinity of the work granules. FIG. 6 shows various lists that are generated to indicate the affinity of the work granules. FIG. 7 depicts a process for establishing the affinity of the work granules.

A set of lists is maintained for each operation. The type of work granules in the lists depends on the type of operation being divided into work granules. For purposes of illustration, the work granules in the lists depicted in FIG. 6 are Block Range Work Granules. These lists include node A affinity list 612, node B affinity list 614, and no affinity list 616. Node A affinity list 612 and node B affinity list 614 contain granules that have been established as having an affinity for node A 102 and node B 110, respectively. No affinity list 616 is a list of work granules that have been established as having no affinity for any particular node.

FIG. 7 is a flow chart showing a process for establishing the affinity of a work granule. The process is performed iteratively for each work granule.

At step 720, it is determined whether the work granule has an affinity for a node. The determination of affinity depends on what affinity factors are being used to determine affinity. When affinity is based on the location of data, the coordinator process 104 examines affinity data 120 to determine which nodes may locally access the data required by a work granule, and the percentage of the required data that is locally accessible to the nodes ("local access percentage"). If the local access percentage meets criteria used to establish the affinity of a work granule for a node, then the work granule is established as having an affinity for that node, and control flows to step 730. Otherwise, the work granule is established as having no affinity for any particular node. Control flows to step 740.

One criteria may be that if the local access percentage of a node is greater than 50%, that is, a majority of the data accessed during execution of a work granule is locally accessible to the node, then the work granule is established as having an affinity for that node. For example, a work granule PWJ belongs to a partition-wise join granule type. During execution of the work granule, three partitions are accessed: PA1, PB1, and PB2. PA1 resides on disk 106, and hence is locally accessible to node A 102. PB1 and PB2 reside on disk 116, and hence are locally accessible to node B. PA1 has 100,000 data blocks, PB1 and PB2 each have 25,000 data blocks. Hence, work granule PWJ has an affinity for node A. If on the other hand, PB1 and PB2 each had 50,000 data blocks, then work granule PWJ would have no affinity for any particular node. Control flows to step 730.

Even when there is no node that may locally access the majority of data required by a work granule, it may beneficial to establish affinity so that the work granule may be executed on a node with at least some affinity for the work granule. For example, a work granule AEJ belongs to a partition-wise join granule type. During execution of the work granule, three partitions are accessed: AE1, AE2, and AE3. AE1 may be locally accessed from node NE1, AE2 may be locally accessed from node NE2, and AE3 may be locally accessed from node NE3. No data required by work granule AEJ may be locally accessed from node NE4. One third of data required by work granule AEJ resides in each of partitions AE1, AE2, and AE3. If the local access percentage of a node is at least as great as the local access percentage of any other node, the work granule is established as having an affinity for that node. Thus, work granule AEJ may be established as having an affinity for either node AE1, AE2, or AE3.

At step 730, the work granule is placed in the list of work granules of a particular Work Granule Type that have an affinity for the node. At step 740, the work granule is placed in the list for work granules of a Work Granule Type that have no affinity for a particular node.

Assigning Work Granules for Execution

Figure 8:
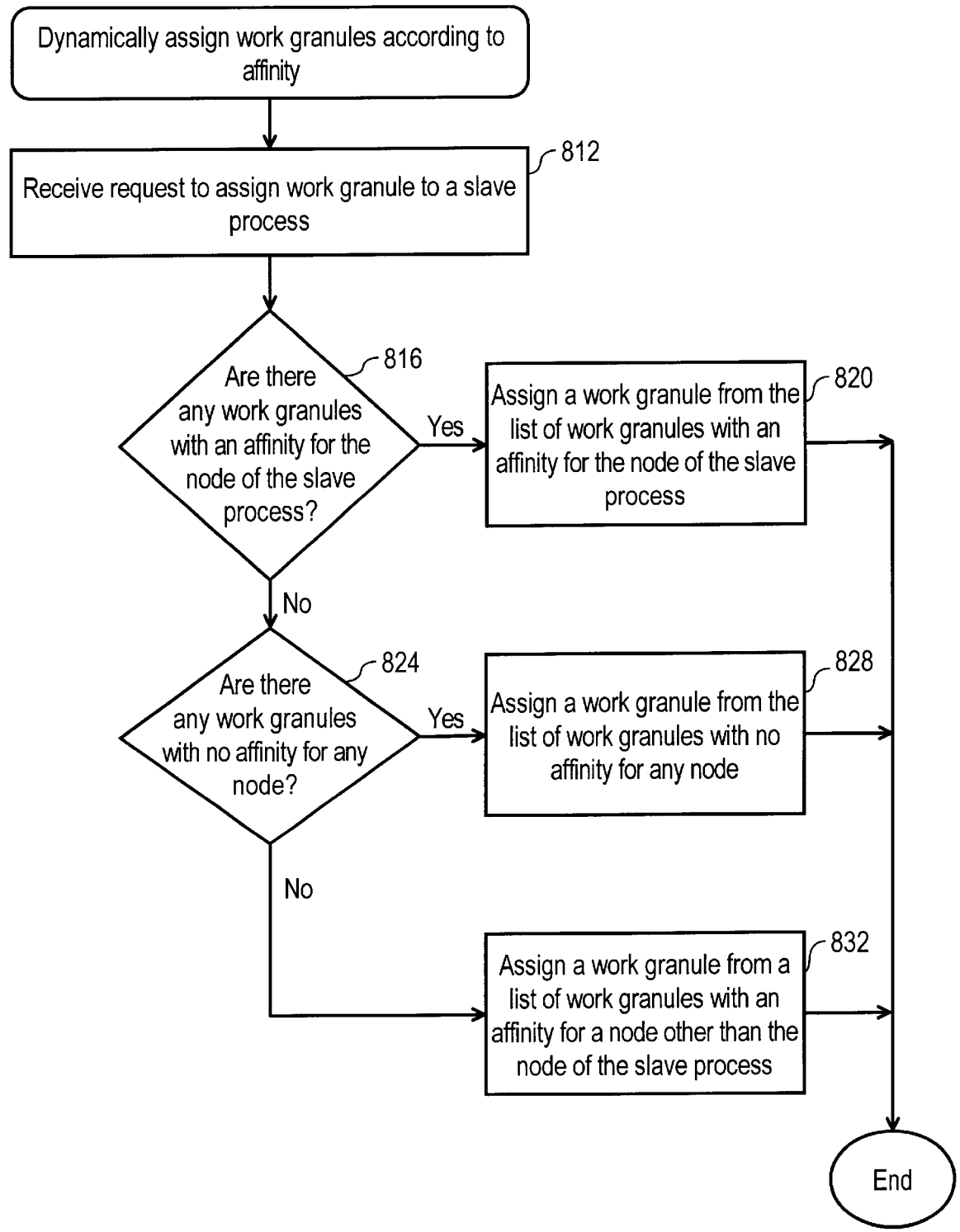
FIG. 8 is a flow chart dynamically assigning work granules to slave processes according to affinity.

Once the affinity has been established for a set of work granules, they are assigned to slave processes in accordance with their established affinities. FIG. 8 is a flow chart depicting a process for assigning work granules to slave processes according to the affinity established for a work granule.

Referring to FIG. 8, at step 812, a request is received to assign a work granule to a slave process. The request may be generated by, for example, a slave process when it completes its previous work granule. Control flows to step 816.

At step 816, it is determined whether there are unassigned work granules with an affinity for the node of the slave process. An unassigned work granule is a work granule that has not been assigned to and executed by a slave process. If there are not any work granules with an affinity for the node, control flows to step 824.

At step 820, an unassigned work granule is selected from a list of work granules with an affinity for the node. For example, if the node is node A, an unassigned work granule is selected from either node A affinity list 612, node A affinity list 632, and node A affinity list 652. Execution of the steps ends.

If, on the other hand, it is determined that there are no unassigned work granules, then control flows to step 824.

At step 824, it is determined whether there are any unassigned work granules that have no particular affinity for the node of the slave process. If there are unassigned work granules that have no particular affinity, then control passes to step 828. At step 828, an unassigned work granule is assigned from a list for work granules with no affinity for a particular node (e.g. no affinity list 616, no affinity list 636, no affinity list 656).

If there are no unassigned work granules that have no particular affinity, then control passes to step 832. At step 832, an unassigned work granule is selected from a list of work granules with an affinity for another node. For example, if the node is node A, an unassigned work granule is assigned from either node B affinity list 614, node B affinity list 634, or node B affinity list 654. Execution of the steps ends.

When there is no unassigned work granule with an affinity for the node of a slave process, a work granule that has no affinity is assigned before a work granule that has an affinity. Thus, work granules with no affinity are executed first, deferring for at least a moment the "stealing" of work granules by a node that executes them less efficiently, and increasing the number of work granules executed by a node that executes the them more efficiently. Overall system performance is improved, and workload skew is reduced.

Hardware Overview

Figure 9:
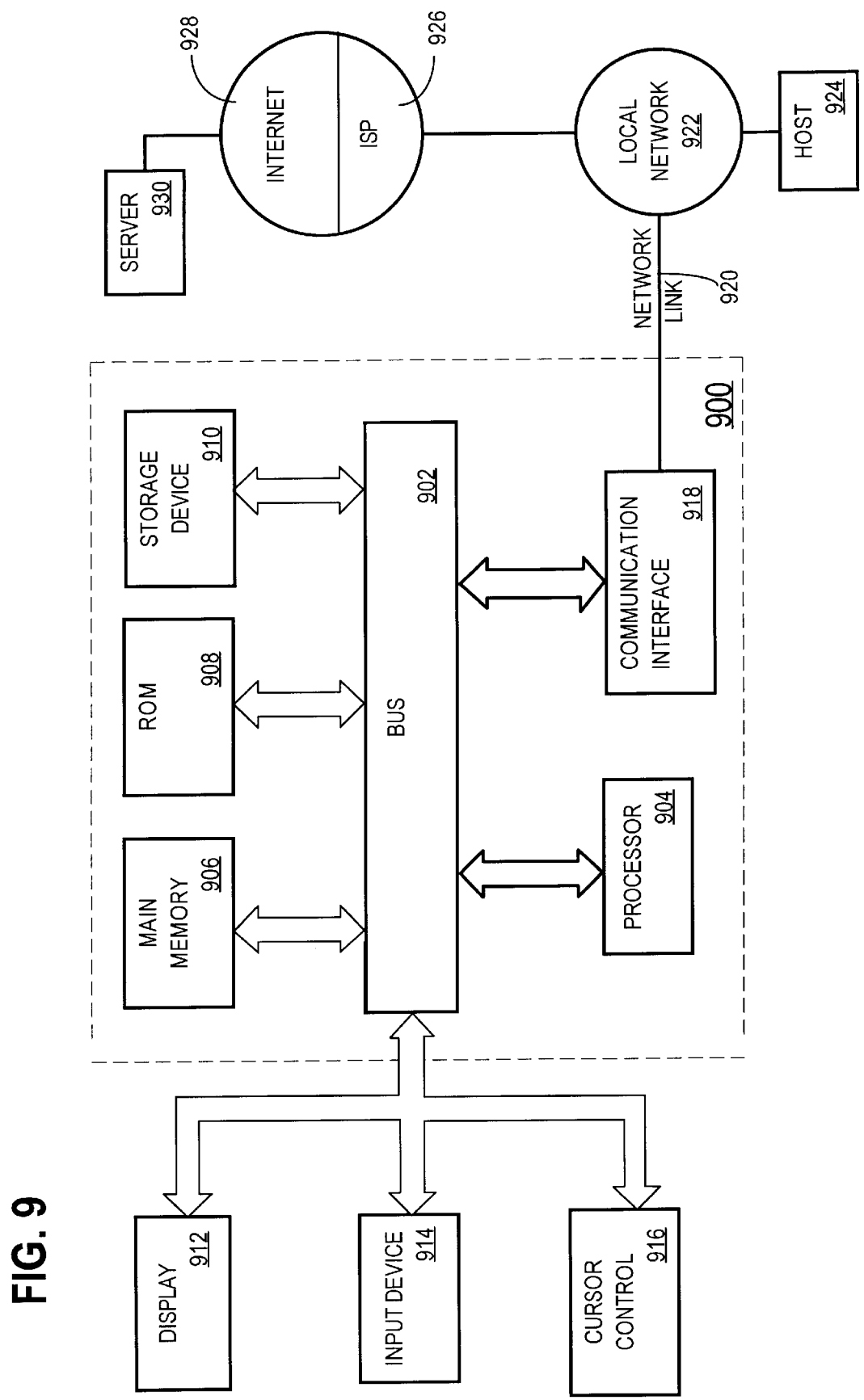
FIG. 9 is a block diagram depicting a computer system upon which an embodiment of the present invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for managing the parallel execution of work granules. According to one embodiment of the invention, managing the parallel execution of work granules is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for managing the parallel execution of work granules as described herein.

The received code may be executed by processor 904 as it is received, and/or stored in storage device 910, or other non-volatile storage for later execution. In this manner, computer system 900 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing the assignment of a plurality of work granules to a plurality of processes on a plurality of nodes, the method comprising the steps of:

making a determination that:
  a portion of a first work granule of said plurality of work granules has an affinity to a particular node of said plurality of nodes, and
  another portion of said first work granule has an affinity to another node of said plurality of nodes;
based on said determination, generating first data that establishes said first work granule as having an affinity to a particular node of said plurality of nodes;
assigning each work granule from the plurality of work granules to a process from said plurality of processes based on said first data; and
wherein a portion of each work granule of said plurality of work granules has an affinity for a given node of said plurality of nodes when the portion of said each work granule can be executed more efficiently by said given node relative to another node of said plurality of nodes.

2. The method of claim 1, wherein the step of generating first data includes the steps of:

generating second data that establishes as not having an affinity for any particular node of said plurality of nodes a second work granule that includes
  a portion of work which has an affinity for a node from said plurality of nodes, and
  another portion of work which has an affinity for another node from said plurality of nodes.

3. The method of claim 2, wherein the step of generating second data includes:

adding said first work granule to a first list that includes work granules established as having an affinity for said particular node; and adding said second work granule to a second list that includes work granules established as having no affinity for any particular node from said plurality of nodes.

4. The method of claim 1, wherein the step of generating first data includes generating first data that establishes as having an affinity to a particular node from said plurality of nodes a particular work granule that specifies a plurality of database table partitions to scan.

5. The method of claim 1, further including the step of determining that a quantity of certain data is accessed during execution of said first work granule;

determining that a majority of said quantity of said certain data resides at a location local to said first node; and wherein the step of establishing said first work granule as having an affinity to said particular node is performed in response to determining that a majority of said quantity of third data resides at a location local to said first node.

6. A method of assigning work granules to a plurality of processes on a plurality of nodes, the method comprising the steps of:

dividing a task into a plurality of work granules that includes
a first set of work granules that each define work by specifying one or more ranges of blocks to scan, and
a second set of work granules that each define work by specifying at least two database table partitions of a database table to scan;

generating first data that specifies, for each work granule of said plurality of work granules, whether said each work granule has an affinity for a particular node of said plurality of nodes;

assigning said plurality of work granules to said plurality of processes based on said first data; and wherein said database table is partitioned into said at least two database table partitions by values in one or more columns of said-database table.

7. The method of claim 6, wherein the step of generating first data includes generating for each of said first set and said second set:

at least one list that includes work granules having an affinity for a particular node from said plurality of nodes; and another list that includes work granules having no particular affinity for a particular node.

8. The method of claim 7, wherein the step of assigning said plurality of work granules includes assigning to a first process on a first node from said plurality of nodes:

a work granule from said at least one list when said at least one list includes work granules that have an affinity for said first node and at least one work granule has not been assigned to a process; and a work granule from said another list when said at least one list includes no work granule that has not been assigned to a process.

9. A computer-readable medium carrying one or more sequences of one or more instructions for managing assignment of a plurality of work granules to a plurality of processes on a plurality of nodes, the one or more sequences of one or more instructions including instructions which, when executed by one or more processors, cause the one or more processors to perform the steps of:

making a determination that:
a portion of a first work granule of said plurality of work granules has an affinity to a particular node of said plurality of nodes, and
another portion of said first work granule has an affinity to another node of said plurality of nodes;

based on said determination, generating first data that establishes said first work granule as having an affinity to a particular node of said plurality of nodes;

assigning each work granule from the plurality of work granules to a process from said plurality of processes based on said first data; and wherein a portion of each work granule of said plurality of work granules has an affinity for a given node of said plurality of nodes when the portion of said each work granule can be executed more efficiently by said given node relative to another node of said plurality of nodes.

10. A computer-readable medium carrying one or more sequences of one or more instructions for assigning work granules to a plurality of processes on a plurality of nodes, the one or more sequences of one or more instructions including instructions which, when executed by one or more processors, cause the one or more processors to perform the steps of:

dividing a task into a plurality of work granules that includes
a first set of work granules that each define work by specifying one or more ranges of blocks to scan, and
a second set of work granules that each define work by specifying at least two database table partitions of a database table to scan;

generating first data that specifies, for each work granule of said plurality of work granules, whether said each work granule has an affinity for a particular node of said plurality of nodes;

assigning said plurality of work granules to said plurality of processes based on said first data; and wherein said database table is partitioned into said at least two database table partitions by values in one or more columns of said database table.

* * * * *